United States Patent [19]

Meyer et al.

[11] E Re. 30,163

[45] Reissued Dec. 11, 1979

[54] CARTON

[75] Inventors: Melvin H. Meyer, Maywood; Gerald G. Weitzel, Oaklawn, both of Ill.

[73] Assignee: Stone Container Corporation, Chicago, Ill.

[21] Appl. No.: 898,327

[22] Filed: Apr. 20, 1978

Related U.S. Patent Documents

Reissue of:

[64] Patent No.: 3,985,230
Issued: Oct. 12, 1976
Appl. No.: 598,712
Filed: Jul. 24, 1975

[51] Int. Cl.[2] ..... B65D 85/30; B65D 85/54

[52] U.S. Cl. ..... 206/424; 229/34 HW; 229/40

[58] Field of Search ..... 206/424; 229/40, 34 HW

[56] References Cited

U.S. PATENT DOCUMENTS

| | | | |
|---|---|---|---|
| 1,997,523 | 4/1975 | Katz | 229/34 R |
| 2,519,831 | 8/1950 | Frankenstein | 229/34 HW |
| 2,755,982 | 7/1956 | Vander Lugt, Jr. | 229/34 HW |
| 3,310,219 | 3/1967 | Olugopolski | 229/34 HW |
| 3,368,735 | 2/1968 | Levi | 229/40 |
| 3,385,424 | 5/1968 | Thompson et al. | 229/36 |
| 3,664,573 | 5/1972 | Partain et al. | 206/424 |
| 3,722,668 | 3/1973 | Carpenter | 206/424 |
| 3,722,783 | 3/1973 | Rous | 229/40 |
| 3,768,721 | 10/1973 | Carpenter et al. | 229/40 |
| 3,792,811 | 2/1974 | Carpenter et al. | 206/424 |
| 3,834,610 | 9/1974 | Eifrid | 206/424 |
| 3,861,580 | 1/1975 | Sieffert | 229/40 |
| 3,871,572 | 3/1975 | Skaggs | 206/424 |
| 3,896,990 | 7/1975 | Sieffert | 206/424 |

*Primary Examiner*—Stephen P. Garbe
*Attorney, Agent, or Firm*—Darby & Darby

[57] ABSTRACT

Cartons for packaging and mailing books and the like include parallel major and minor walls which are foldably interconnected to form a tubular structure and a closure and protecting structure for each end of the tubular structure including end flaps which are folded to form triangularly shaped air cushions, and, in a modification, a trapezoidally shaped air cushion. The end flaps are provided with locking tabs which engage corresponding notches in the top surface of one of the major walls in order to form the air cushions.

12 Claims, 11 Drawing Figures

CARTON

Matter enclosed in heavy brackets [ ] appears in the original patent but forms no part of this reissue specification; matter printed in italics indicates the additions made by reissue.

BACKGROUND OF THE INVENTION

This invention generally relates to cartons for packaging and mailing books and the like, having triangularly shaped closure ends or bumpers which provide protection for the enclosed book.

Although cartons of this type heretofore produced, such as the cartons disclosed in U.S. Pat. No. 3,682,370, have been generally satisfactory, a savings in the amount of paperboard material needed to construct such cartons is effected by the improved cartons of this invention. Furthermore, the machines necessary to automatically erect and package the improved cartons of this invention are less complex than the machines previously used.

SUMMARY OF THE INVENTION

This invention provides a carton for packaging and mailing an article which is formed from a unitary blank of foldable paperboard and which is composed of two major parallel walls and two minor parallel walls which are foldably interconnected to form a tubular structure and a closure and protecting structure for each end of the tubular structure.

In the preferred embodiment, the closure and protecting structure includes a first end flap which is foldably connected to the first of the major parallel walls and a second end flap which is hingedly connected to the first flap. The first flap is folded obliquely with respect to the first major wall, and the second end flap is folded to a position generally perpendicular to the first major wall thereby forming a triangularly shaped air cell or bumper. A pair of outer end flaps are foldably connected to the second major wall and are folded to a position in facing relationship with the outer surface obliquely extending first end flap.

In an alternate embodiment, a third end flap is foldably connected to the second end flap and the third flap is folded to a position in facing relationship with the first major wall.

In another embodiment of this invention, the first end flap which is connected to the first major wall is divided into a first section and a second section with the first section being folded obliquely with respect to the first major wall, the second section being in facing relationship with the second major wall and the second end flap being folded to a position generally perpendicular to the first major wall, thereby forming a trapezoidally shaped air cell.

Another feature of this invention is that locking tabs are provided on the ends of the second end flaps which are folded to a position generally perpendicular to the first major wall. These locking tabs are adapted to fit within notches formed in the first major wall which are formed by cutting two closely spaced lines in the top surface of the first major wall and compressing the area of the major wall between the two lines. The locking tabs and notches combine to provide a rigid or self-supported air cell which does not require the book or article to be in the carton in order for the cell to remain erect. This feature of the invention is helpful in the automatic erecting and packaging of the carton, since it is not necessary to insert the book or article in the carton in order to maintain the air cell in an erect or supported position.

Another feature of this invention relates to an easy opening tab on the triangularly shaped air cell which permits a user to tear away the outer flap of the triangular bumper and pull the triangular bumper apart so as to permit access to the book contained in the carton. This can be accomplished without destroying the carton and permits the user to return the book in the same carton by simply attaching a strip of tape to the triangular bumper whose outer flap has been torn away.

The structural features of the invention and the complete nature thereof will become further apparent following a consideration of the ensuing specification and the appended claims in which the invention is defined, particularly when taken in conjunction with the accompanying illustrative drawings setting forth a preferred embodiment of the invention.

DESCRIPTION OF A PREFERRED AND ALTERNATE EMBODIMENTS

Figure 1:
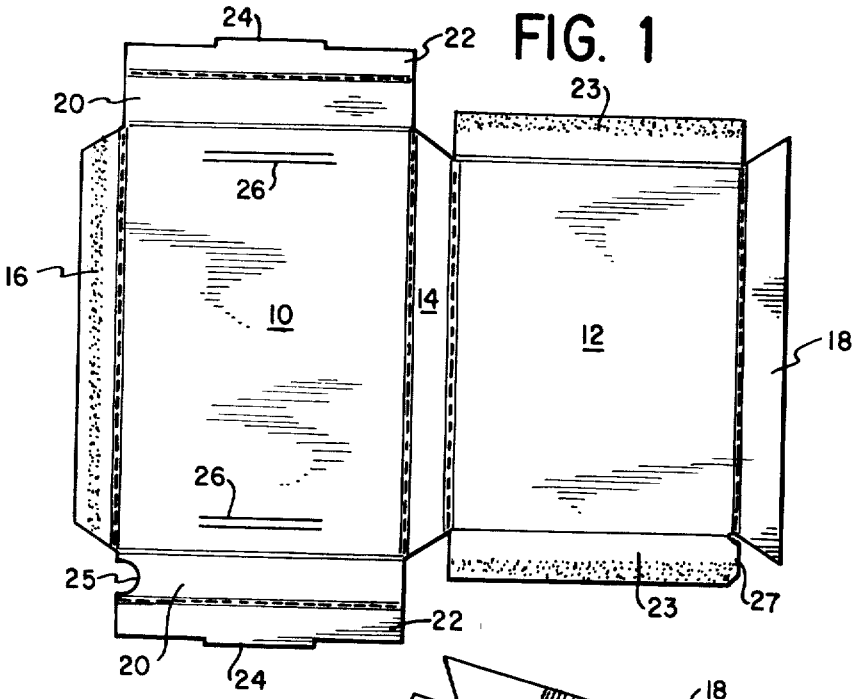
FIG. 1 is a top elevational view of an unerected carton showing the preferred embodiment of my invention.

Referring to FIG. 1, the major parallel walls 10 and 12 (sometimes hereinbelow referred to as the first major wall 10 and the second major wall 12) are adapted to be joined together to form a tubular structure by minor parallel walls 14 and 16 which are foldably connected to the major wall 10 and side flap 18 which is foldably connected to major wall 12. The closure and protecting structure for the carton blank illustrated in FIG. 1 includes, at each end of the major wall 10, a first end flap 20 which is foldably connected to major wall 10 and a second end flap 22 which is foldably connected to first flap 20, and a first end flap 23 which is foldably connected to major wall 12.

A tab 24 is formed on the outermost end of each of the major wall second end flaps 22. A corresponding notch 26 is formed in the top surface of the major wall 10 and is adapted to receive the tab 24. The construction of the notch 26 is discussed in more detail below.

Figure 2:
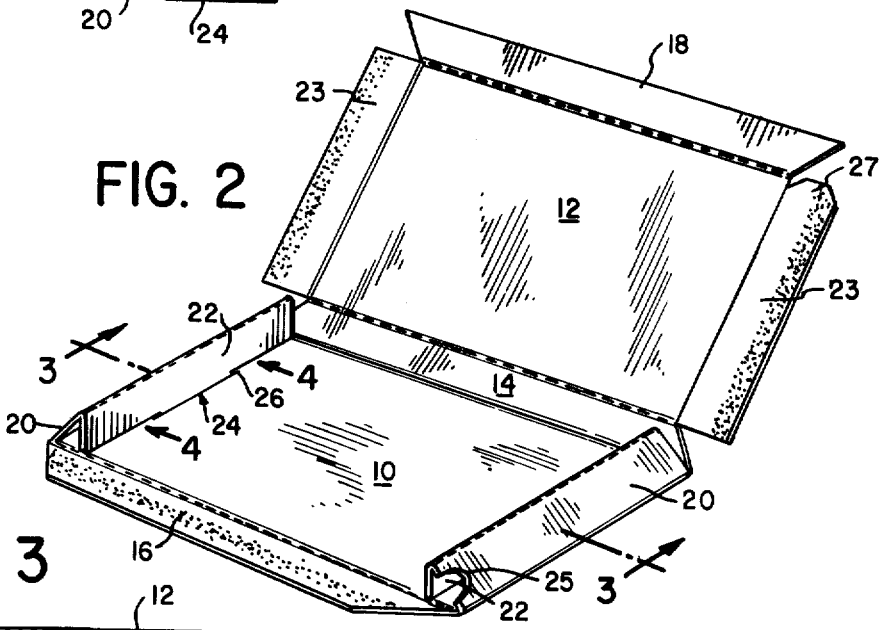
FIG. 2 is a perspective view of a partially erected carton which is illustrated unerected in FIG. 1.
Figure 3:
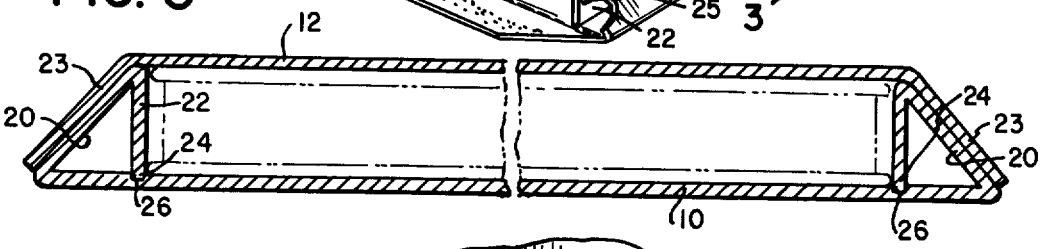
FIG. 3 is a cross-sectional view of the carton illustrated in FIG. 2 taken along the line 3—3.
Figure 4:
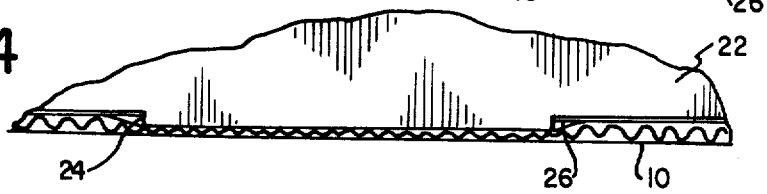
FIG. 4 is a cross-sectional view with parts broken away of the carton illustrated in FIG. 2 taken along the line 4—4.

Referring to FIGS. 2 and 3, first major wall first end flaps 20 are folded to form an oblique angle with the first major wall 10, and first major wall second end flaps 22 are folded to a position generally perpendicular to first major wall 10 thereby forming a triangularly shaped bumper or air cell at both ends of the carton. Also, second major wall end flaps 23 are folded to be in facing relationship with the outer face of first major wall first end flaps 20, as best illustrated in FIG. 3. Second major wall side flap 18 is folded to be in facing relationship with the inner face of first major wall side flap 16. The speckling on second major wall end flaps 23 and side flap 16 indicates that glue is applied to these flaps and they are fastened to the corresponding flaps of the first major wall 10 mentioned above during the carton erecting and packaging operation.

Another feature of this invention involves the formation of locking tabs 24 on the ends of the first major wall second end flaps 22. When these locking tabs 24 are inserted into the corresponding notches 26 formed on the top surface of the first major wall 10, a rigid or self-supporting triangular bumper is formed without the necessity of placing a book or other object in the carton to hold the bumpers or air cells in place. This greatly simplifies the carton erecting and packaging operation.

Another aspect of this invention involves the particular construction of the notches 26 which are formed in the top surface of the first major wall 10. These notches are formed by cutting closely spaced lines across a portion of the top surface of the first major wall 10. However, these cut lines do not extend through the major wall 10. The area between the cut lines is compressed to form a depression in the top surface of the first major wall 10. The locking tabs 24 engage this depression to form the rigid triangular bumpers illustrated in FIG. 3. It is noted that the first major wall second end flap 22 does not extend through the major wall 10 so that there are no obstructions on the outer surface of the first major wall 10 which would hinder handling or stacking of these cartons.

Figure 4A:
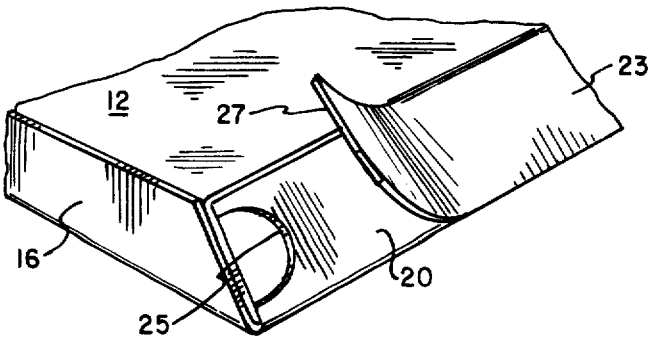
FIG. 4A is a partial perspective view with parts broken away of the carton illustrated in FIG. 2 with the outer flap partially torn away.

The easy opening tab in the carton of this invention is illustrated in FIGS. 1, 2, 4A and 5. This feature consists of a finger hole 25 formed in the first end flap 20 and a chamfered end 27 formed on the second major wall end flap 23. Referring now to FIG. 4A, in order to open the carton, it is merely necessary to grasp the chamfered end 27 of the second major wall end flap 23 and pull the flap back. The line of connection between the second major wall end flap 23 and the second major wall 12 is scored so that the flap 23 tears away from the second major wall 12 when it is pulled back. After the flap 23 is removed from the carton, the user may place a finger in the finger hole 25 and pull the triangular bumper outwardly thereby permitting access to the book. If the book is to be returned, it is only necessary to reinsert it into the carton, to re-form the triangular bumper, and to place a piece of tape from one major wall to the other across the bumper.

Figure 5:
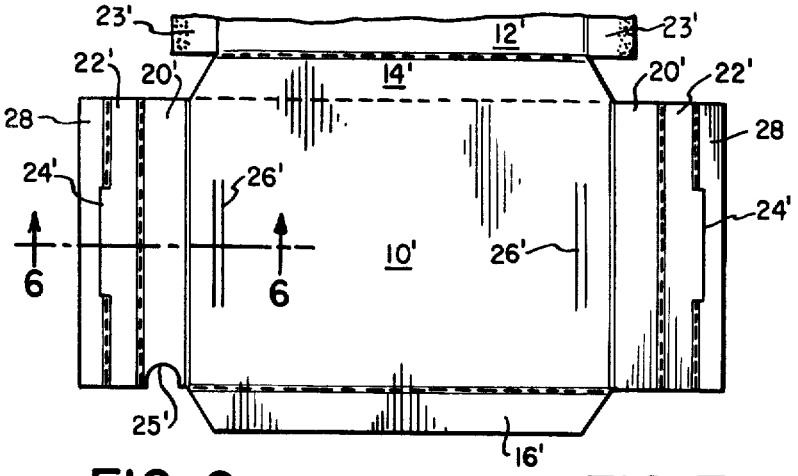
FIG. 5 is a top elevational view of an unerected carton showing an alternate embodiment of this invention.

Referring now to FIG. 5, the primed reference numerals therein (and also in FIGS. 6 and 7) refer to elements which are identical to those elements which are described herein with respect to FIGS. 1–4 and which were assigned the same unprimed numerals in FIGS. 1–4. Thus, the alternate embodiment of FIG. 5 is substantially the same as the preferred embodiment of FIG. 1 with the sole exception that a third end flap 28 is foldably connected to the first major wall second end flap 22'.

Figure 6:
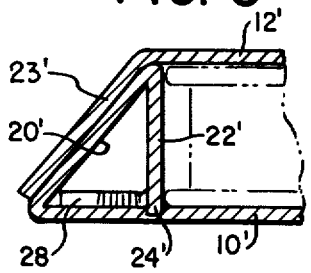
FIG. 6 is a cross-sectional view of a portion of the carton illustrated in FIG. 5 in an erect position and taken along the line 6—6.

Referring to FIG. 6, first major wall third end flap 28 is folded (and may be glued) to a position in facing relationship with first major wall 10' in the direction toward the line of fold between the first major wall 10' and the first major wall first end flap 20'.

As in the preferred embodiment, a locking tab 24' is formed on the end of each of the first major wall second end flaps 22'. Accordingly, a correspondingly shaped cut-out (not shown) is formed in the additional major wall third end flap 28 when the carton is erected, as illustrated in FIG. 6.

Figure 7:
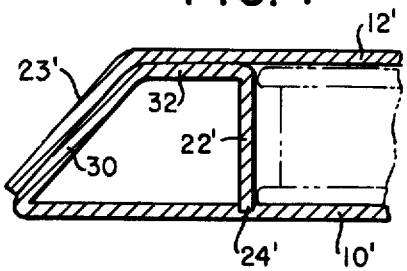
FIG. 7 is a cross-sectional view of an erected carton showing another alternate embodiment of this invention.

FIG. 7 illustrates a modification of the carton illustrated in FIG. 1 whereby a trapezoidally shaped bumper is formed instead of the triangularly shaped bumper illustrated in FIG. 3. In the alternate embodiment illustrated in FIG. 7, an additonal fold line is formed in the first major wall first end flap 20', thereby dividing that end flap into a first section 30 and a second section 32. The first major wall first end flap first section 30 is folded obliquely with respect to the major wall 10 as in the preferred embodiment. However, the first major wall first end flap second section 32 is folded to a position in facing relationship with the inner surface of the second major wall 10'. As in the first embodiment, the first major wall second end flap 22' is folded to a position generally perpendicular to the first major wall 10', thereby forming a trapezoidally shaped bumper at each end of the carton.

Figure 8:
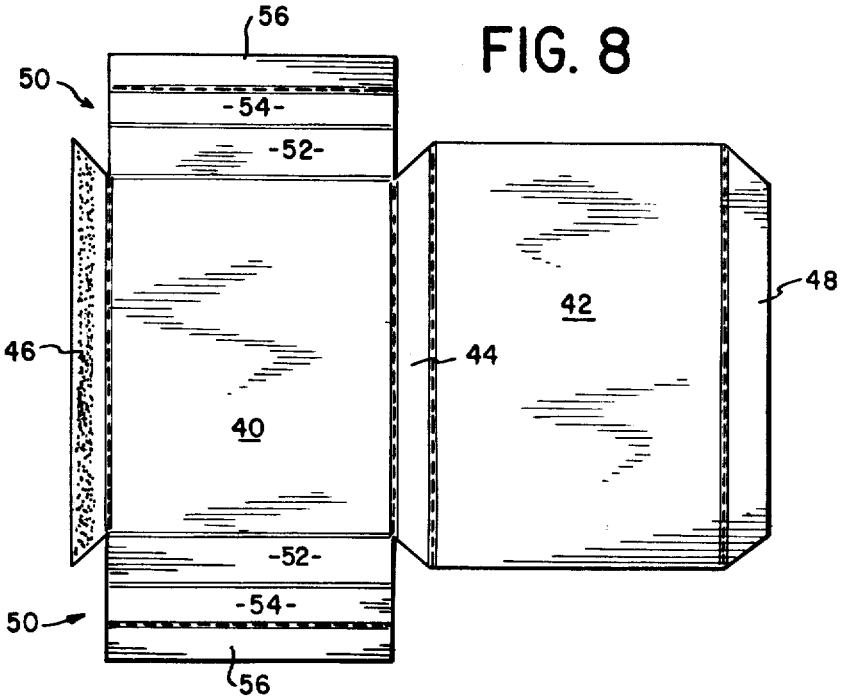
FIG. 8 is a top elevational view of an unerected carton showing another alternate embodiment of this invention.

Referring now to FIG. 8, another alternate embodiment of this invention is illustrated in which the first and second major parallel walls 40 and 42, respectively, are adapted to be foldably interconnnected by minor parallel walls 44 and 46 to form a tubular structure. Second major wall side flap 48 is adapted to be folded into facing relationship with the inner surface of minor parallel wall 46 to form a tubular structure.

The closure and protecting structure for the ends of the tubular structure consists of a first end flap 50 which is foldably connected to each end of first major wall 40 and which is divided into a first section 52 and a second section 54 along a fold line. A first major wall second end flap 56 is foldably connected to the major wall end flap second section 54.

Figure 9:
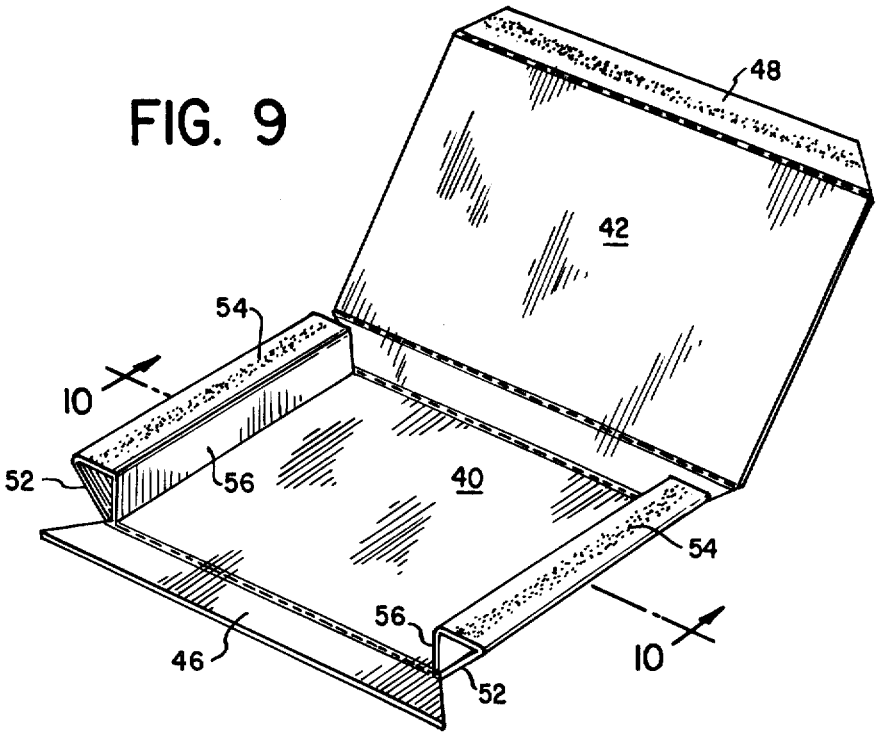
FIG. 9 is a perspective view of a partially erected carton which is illustrated unerected in FIG. 8.
Figure 10:
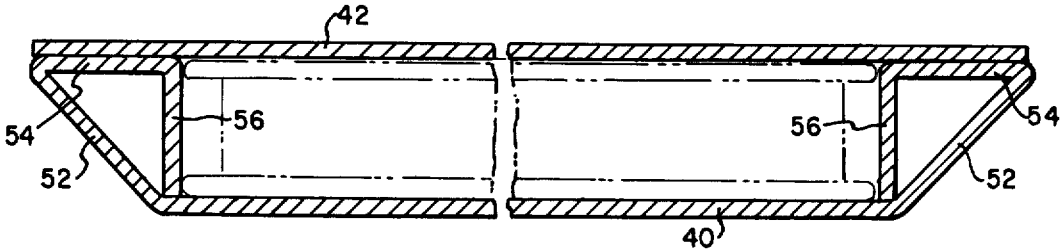
FIG. 10 is a cross-sectional view of an erected carton illustrated in FIG. 9 taken along the lines 10—10.

Referring to FIGS. 9 and 10, the first major wall first end flap first section 52 is folded to form an oblique angle with respect to the first major wall 40, the first major wall first end flap second section 54 is folded to be in facing relationship with the inner surface of the second major wall 42 and the first major wall second end flap 56 is folded to a position generally perpendicular to the first major wall 40, thereby forming a triangularly shaped bumper or air cell at each end of the carton.

Referring to FIG. 9, the speckled surfaces of second major wall side flap 46 and first major wall first end flap second sections 54 indicate that glue is applied to these surfaces and that they are fastened to the corresponding structure described above.

Upon examining the foregoing disclosure, those skilled in the art may devise embodiments of the concepts involved which differ somewhat from the embodiments shown and described herein or may make various changes in the structural details to the present embodiments such as, for example, providing tabs on the ends of the first major wall second end flaps illustrated in FIG. 8 and corresponding notches in the top surface of first major wall 40. Consequently, all such changed embodiments or variations in structure as utilize the concepts of the invention and clearly incorporate the spirit thereof are to be considered as within the scope of the claims appended herebelow.

What is claimed is:

1. A cushioned shipping folder *for use with automatic packaging machines* formed from a unitary blank of foldable paperboard or the like, comprising:

first and second major parallel walls and first and second minor parallel walls foldably interconnected to form a tubular structure, said first and second major parallel walls being rectangular in shape, said first major wall being greater in length than said second major wall; a closure and protecting structure for each end of said tubular structure including first and second flaps foldably connected to each other along a straight fold line extending the entire length of said first and second flaps, said first and second flaps being rectangular in shape and coextensive in length with each other and with the width or shorter dimension of said first major wall, said first flap being foldably connected to said first major parallel wall along a straight fold line extending along the entire width or shorter dimension of said first major wall [,]; said first flap being folded obliquely with respect to said first major wall, said second flap being folded to a position generally perpendicular to said first major wall, said first flap, said second flap and a portion of said first major wall forming a uniformly shaped triangular air cushion extending across the entire width of said first major wall, a pair of generally rectangularly shaped outer flaps foldably connected to said second major wall, each of said outer flaps being coextensive in length with the width or shorter dimension of said second major wall, being folded to a position in facing relationship with said obliquely extending first flap and being glued to said obliquely extending first flap in a flat oblique plane *so that the fold line between each of said first and second flaps engages one of the fold lines between said outer flaps and said second major wall in the erected carton.*

2. [The folder recited in claim 1,] *A cushioned shipping folder formed from a unitary blank of foldable paperboard or the like, comprising: first and second major parallel walls and first and second minor parallel walls foldably interconnected to form a tubular structure, said first and second major parallel walls being rectangular in shape, said first major wall being greater in length than said second major wall; a closure and protecting structure for each end of said tubular structure including first and second flaps foldably connected to each other along a straight fold line extending the entire length of said first and second flaps, said first and second flaps being rectangular in shape and coextensive in length with each other and with the width or shorter dimension of said first major wall, said first flap being foldably connected to said first major parallel wall along a straight fold line extending along the entire width or shorter dimension of said first major wall, said first flap being folded obliquely with respect to said first major wall, said second flap being folded to a position generally perpendicular to said first major wall; said first flap, said second flap, and a portion of said first major wall forming a uniformly shaped triangular air cushion extending across the entire width of said first major wall, a pair of generally rectangularly shaped outer flaps foldably connected to said second major wall, each of said outer flaps being coextensive in length with the width or shorter dimension of said second major wall, being folded to a position in facing relationship with said obliquely extending first flap and being glued to said obliquely extending first flap in a flat oblique plane so that the fold line between each of said first and second flaps engages one of the fold lines between said outer flaps and said second major wall in the erected carton,* said closure and protecting structure further comprising a third flap foldably connected to said second flap along a fold line, said third flap being coextensive in length with said second flap, said third flap being folded to a position in facing relationship with said first major wall *in the direction of the line of fold between said first major wall and said first inner flap thereby forming a double thickness along the entire length of said air cushion.*

[3. The folder recited in claim 2, said third inner flap being folded to extend in the direction of the line of fold between said first major wall and said first inner flap.]

4. [The folder recited in claim 2,] *A cushioned shipping folder formed from a unitary blank of foldable paperboard or the like, comprising: first and second major parallel walls and first and second minor parallel walls foldably interconnected to form a tubular structure, said first and second major parallel walls being rectangular in shape, said first major wall being greater in length than said second major wall; a closure and protecting structure for each end of said tubular structure including first and second flaps foldably connected to each other along a straight fold line extending the entire length of said first and second flaps, said first and second flaps being rectangular in shape and coextensive in length with each other and with the width or shorter dimension of said first major wall, said first flap being foldably connected to said first major parallel wall along a straight fold line extending along the entire width or shorter dimension of said first major wall, said first flap being folded obliquely with respect to said first major wall, said second flap being folded to a position generally perpendicular to said first major wall; said first flap, said second flap and a portion of said first major wall forming a uniformly shaped triangular air cushion extending across the entire width of said first major wall, a pair of generally rectangularly shaped outer flaps foldably connected to said second major wall, each of said outer flaps being coextensive in length with the width or shorter dimension of said second major wall, being folded to a position in facing relationship with said obliquely extending first flap and being glued to said obliquely extending first flap in a flat oblique plane; said closure and protecting structure further comprising a third flap foldably connected to said second flap along a fold line, said third flap being coextensive in length with said second flap, said third flap being folded to a position in facing relationship with said first major wall;* a pair of notches being formed in said first major wall, *each of said pair of notches being* in alignment with the line of fold between *one of* said outer [flap] *flaps* and said second major wall; said closure and protecting structure further comprising a tab formed on said second inner flap, said second inner flap being folded to a position of said tab engaging said major wall notches, said third inner flap being foldably connected to said second inner flap along spaced apart lines of fold, said tab being located between said spaced apart lines of fold, said tab being separable from said third inner flap by a cut line.

5. The folder recited in claim 4, each of said notches comprising a pair of closely spaced lines being cut into the top surface of said first major wall but not through said first major wall, the portion of said first major wall top surface between said lines being compressed thereby forming a depression in said first major wall top surface.

6. The folder recited in claim 2, said third flap being glued to said first major wall.

7. The folder recited in claim 1, a pair of notches being formed in said first major wall, *each of said pair of notches being* in alignment with the line of fold between *one of* said outer [flap] *flaps* and *said* second major wall; said closure and protecting structure further comprising a tab formed on said second flap, said second flap being folded to a position of said tab engaging said major wall notches.

8. The folder recited in claim 7, each of said notches comprising a pair of closely spaced lines being cut into the top surface of said first major wall but not through said first major wall, the portion of said first major wall top surface between said lines being compressed thereby forming a depression in said first major wall top surface.

[9. The folder recited in claim 1, the line of fold between said first and second inner flaps being engageable with the line of fold between said second major wall and said outer flaps.]

10. The folder recited in claim 1, the fold line foldably connecting each of said outer flaps to said second major wall being scored such that each of said outer flaps tears away from said second major wall when pulled back.

11. A cushioned shipping folder formed from a unitary blank of foldable paperboard or the like, comprising:

first and second major parallel walls and first and second minor parallel walls foldably interconnected to form a tubular structure, said first and second major parallel walls being rectangular in shape, said first major wall being greater in length than said second major wall; a closure and protecting structure for each end of said tubular structure including first and second flaps foldably connected to each other along a straight fold line extending the entire length of said first and second flaps, said first and second flaps being rectangular in shape and coextensive in length with each other and with the width or shorter dimension of said first major wall, said first flap being foldably connected to said first major parallel wall along a straight fold line extending along the entire width or shorter dimension of said first major wall, at least a [portion] *section* of said first flap being folded obliquely with respect to said first major wall, said second flap being folded to a position generally perpendicular to said first major wall, [said first flap portion, said second flap and a portion of said first major wall forming a uniformly shaped air cushion extending across the entire width of said first major wall,] said closure and protecting structure further comprising an additional fold line being formed in said first inner flap thereby dividing said first inner flap into a first and a second section, said first inner flap first section being folded obliquely with respect to said first major wall, the fold line between said first inner flap first and second sections being engageable with the line of fold between said outer flap and said second major wall, said first inner flap second section being folded to a position in facing relationship with said second major wall, thereby forming a trapezoidally shaped bumper; *said first and second sections, said second flap and a portion of said first major wall forming a uniformly shaped air cushion extending across the entire width of said first major wall.*

12. A cushioned shipping folder formed from a unitary blank of foldable paperboard or the like, comprising:

first and second major parallel walls and first and second minor parallel walls foldably interconnected to form a tubular structure, said first and second major parallel walls being rectangular in shape, said first major wall being [greater] *lesser* in length than said second major wall; a closure and protecting structure for each end of said tubular structure including first and second flaps foldably connected to each other along a straight fold line extending the entire length of said first and second flaps, said first and second flaps being rectangular in shape and coextensive in length with each other and with the width or shorter dimensions of said first major wall, said first flap being foldably connected to said first major parallel wall along a straight fold line extending along the entire width or shorter dimension of said first major wall, [at least a portion of said first flap being folded obliquely with respect to said first major wall, said second flap being folded to a position generally perpendicular to said first major wall, said first flap portion, said second flap and a portion of said first major wall forming a uniformly shaped air cushion extending across the entire width of said first major wall,] said closure and protecting structure further comprising an additional fold line being formed in said first [inner] flap thereby dividing said first [inner] flap into a first and second section, said first [inner] flap first section being folded obliquely with respect to said first major wall, said first [inner] flap second section being folded to a position in facing relationship with said section major wall, *said second flap being folded to a position generally perpendicular to said first major wall, said first flap first and second sections and said second flap forming a uniformly shaped air cushion extending across the entire width of said first major wall,* the fold line between said first [inner] flap first and second section being engageable with the end edge of said second major wall.

13. The folder recited in claim 12, said first [inner] flap second section being glued to said second major wall.

*14. The folder recited in claim 1 or 2, the bottom edges of said first and second minor parallel walls being coextensive in length with said first major wall.*

* * * * *